United States Patent [19]

Kimball

[11] Patent Number: 4,692,776

[45] Date of Patent: Sep. 8, 1987

[54] DROP DISPENSING DEVICE AND METHOD FOR ITS MANUFACTURE

[75] Inventor: Philip M. Kimball, Norwell, Mass.

[73] Assignee: Polaroid Corporation, Cambridge, Mass.

[21] Appl. No.: 906,978

[22] Filed: Sep. 15, 1986

[51] Int. Cl.[4] .............................................. G01D 15/16

[52] U.S. Cl. ................................ 346/140 R; 29/25.35; 417/322

[58] Field of Search ................. 346/140, 1.1; 310/369; 417/322; 29/25.35; 239/102.2

[56] References Cited

U.S. PATENT DOCUMENTS

| | | | |
|---|---|---|---|
| 3,281,860 | 10/1966 | Adams et al. | 346/75 |
| 3,747,120 | 7/1973 | Stemme | 346/75 |
| 3,852,773 | 12/1974 | Sicking et al. | 346/140 |
| 3,965,376 | 6/1976 | Arndt | 310/8.5 |
| 4,068,144 | 1/1978 | Toye | 310/327 |
| 4,131,899 | 12/1978 | Christou | 346/140 R |
| 4,245,227 | 1/1981 | Krause | 346/75 |
| 4,303,927 | 12/1981 | Tsao | 346/75 |
| 4,326,205 | 4/1982 | Fischbeck et al. | 346/140 R |
| 4,353,078 | 10/1982 | Lee et al. | 346/140 R |
| 4,364,066 | 12/1982 | Koto | 346/140 R |
| 4,387,383 | 6/1983 | Sayko | 346/140 R |
| 4,406,405 | 9/1983 | Marichy | 239/102 |
| 4,434,430 | 2/1984 | Koto | 346/140 R |
| 4,437,103 | 3/1984 | Ikeda | 346/140 R |
| 4,449,135 | 5/1984 | Umezawa | 346/75 |
| 4,459,601 | 7/1984 | Howkins | 346/140 R |
| 4,502,054 | 2/1985 | Brescia et al. | 346/75 |
| 4,516,140 | 5/1985 | Durkee et al. | 346/140 R |
| 4,528,571 | 7/1985 | Sweet | 346/75 |
| 4,530,464 | 7/1985 | Yamamoto et al. | 239/102 |
| 4,550,325 | 10/1985 | Viola | 346/140 R |
| 4,555,717 | 11/1985 | Miura et al. | 346/140 R |
| 4,625,373 | 12/1986 | Duffield | 29/25.35 |
| 4,641,155 | 2/1987 | Zoltan | 346/140 |

*Primary Examiner*—Joseph W. Hartary
*Attorney, Agent, or Firm*—Robert L. Berger

[57] ABSTRACT

A fluid drop dispensing device, particularly suited for ink jet printer heads, in which a circular electroactuator is supported in concentric relationship with inner and outer ring members defining an annular chamber which is reduced in volume upon excitation of the electroactuator. The chamber is defined as a peripheral groove in one or the other of the inner and outer rings and is rendered fluid tight exclusively by peripheral ring surface contact maintained by hoop stress in the two rings as a result of press fitting the inner ring into the outer ring. Both rings may be of plastic material selected for appropriate characteristics or in the alternative, the outer ring may be of plastic while the inner ring is metallic and fabricated of stainless steel or nickel, for example.

14 Claims, 8 Drawing Figures

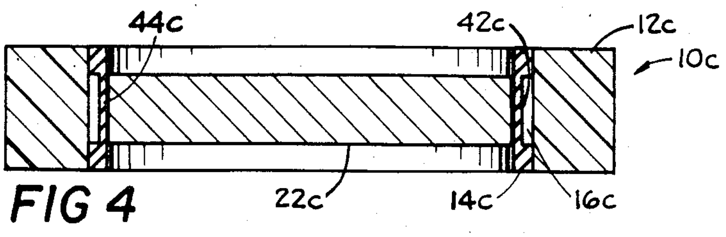
FIG 4
FIG 5
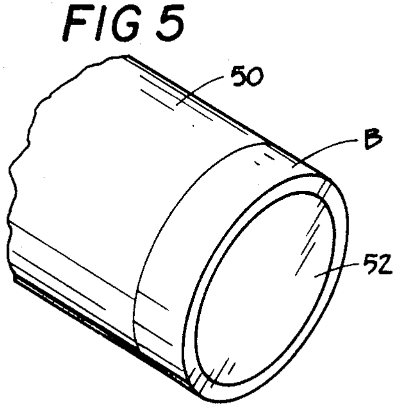
FIG 6
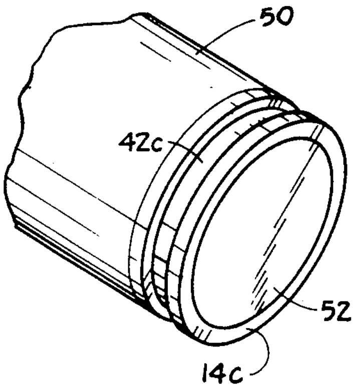
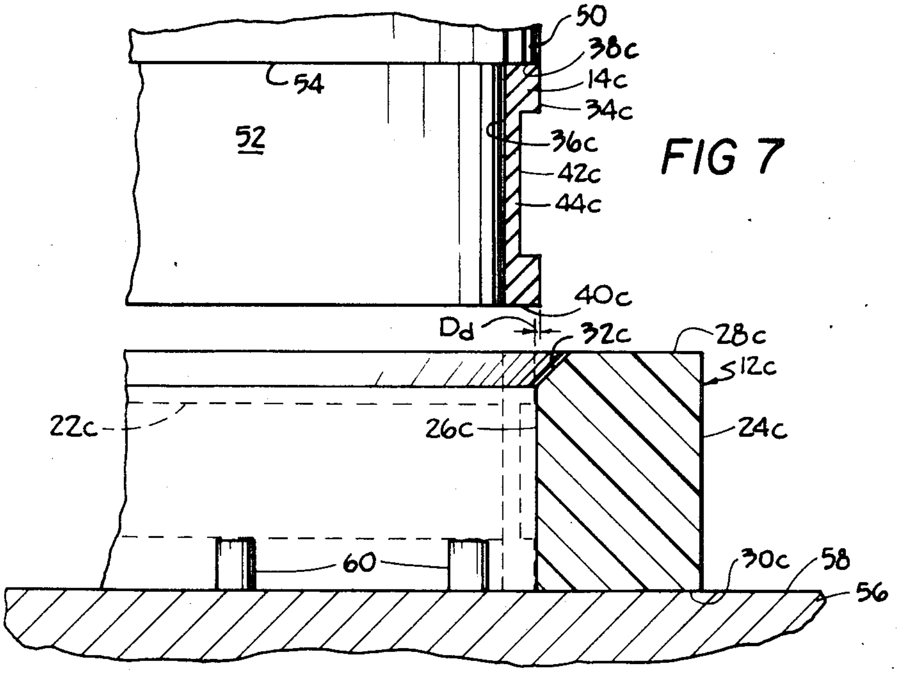
FIG 7

DROP DISPENSING DEVICE AND METHOD FOR ITS MANUFACTURE

BACKGROUND OF THE INVENTION

This invention relates to fluid drop dispensing devices and methods for the manufacture of such devices. More particularly, it concerns droplet dispensing devices intended primarily, though not exclusively, for use in ink jet printers and to the method for forming and assembling the components thereof.

Commonly assigned U.S. Pat. No. 4,550,325 issued on Oct. 29, 1985 discloses a fluid drop dispenser in which a circular piezoelectric actuator disk is oriented concentrically with an annular fluid receiving chamber in a manner such that when the disk is electrically excited, it expands radially to compress the annular chamber and expel a drop of the fluid through a nozzle in an exterior wall of the chamber. Apart from the piezoelectric disk, the device disclosed in the aforesaid patent is constructed entirely from injection moldable plastic parts constituted primarily by inner and outer ring-shaped members. The outer ring supports a drop dispensing nozzle and defines a relatively rigid or fixed inwardly facing cylindrical wall surface to establish the outer surface of the annular chamber. The inner ring telescopes within the outer ring and is formed with a relatively thin cylindrical wall portion engaged on its inner surface by the piezoelectric disk and having its outer surface spaced from the inner surface of the outer ring by the radial dimension of the annular chamber. The two rings are secured to each other to maintain their assembled condition and also to render the annular chamber fluid tight by solvent or adhesive bonding or by ultrasonic fusion. Also the outer peripheral surface of the electroactuator disk is secured by an adhesive to the inner surface of the inner ring in the region of the relatively thin flexible wall thereof.

While drop dispensers of the type disclosed in the aforementioned patent have demonstrated considerable potential for highly effective use in ink jet printers as well as in other precisely controlled drop dispensing applications, and may be manufactured very inexpensively as a result of component formation by injection molding, the requirements for bonding or otherwise fusing the plastic parts is relatively tedious and presents a problem particularly in light of the extremely small size of the assembled dispenser. Extreme care must be taken in the bonding or fusion parts to insure complete sealing of inter-fitting surfaces without distorting operating surface portions which have an effect on the drop formation to be discharged each time the electroactuator disk is excited. Accordingly, there is a need for improvement particularly in the solution of problems associated with fusion of the assembled dispenser components.

SUMMARY OF THE INVENTION

In accordance with the present invention, an improved drop dispensing device and method for its assembly are provided by a design in which the components of the dispenser may be assembled in fluid tight relationship without fusion, solvent or adhesive bonding. Generally, inner and outer ring members configured to establish an annular chamber to be reduced in volume by excitation of a centrally disposed actuator disk are constructed to be assembled and sealed by press fit and to receive the actuator in a manner to optimize single drop dispensing operation of the assembled device.

The ring members may be formed from a variety of materials selected to provide needed rigidity in the outer ring as well as wall flexibility in the inner ring required for response to actuator excitation. The annular chamber is preferably defined by a peripheral groove in one of the rings to enable an axial press-fit between the one ring and a fully cylindrical surface on the other of the two rings. Formation of the annular chamber defining grooves on the outer surface of the inner ring is preferred from the standpoint of facilitating formation of the groove and press fit assembly.

Accordingly, a principal object of the present invention is to provide an easily assembled, highly precise drop dispensing device. Another object of the invention is the provision of the drop dispensing device of a design capable of accommodating a variety of materials. A still further object of the present invention is the provision of an efficient method for producing drop dispensing devices in accordance with the invention. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 4 is a similar cross section illustrating a still further embodiment of the invention;

FIGS. 5 and 6 are fragmentary perspective views illustrating successive steps in the formation of an inner ring member in accordance with the embodiment of FIG. 4; and FIG. 7 is an enlarged fragmentary cross section illustrating assembly of the drop dispensing device components.

DETAILED DESCRIPTION OF THE PREFERRED EMBODIMENTS

Figure 1:
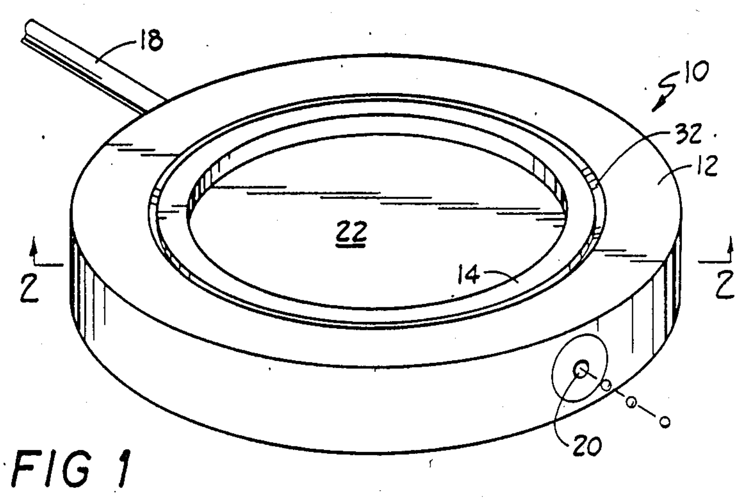
FIG. 1 is a perspective view illustrating an assembled drop dispensing device in accordance with one embodiment of the invention.
Figure 2:
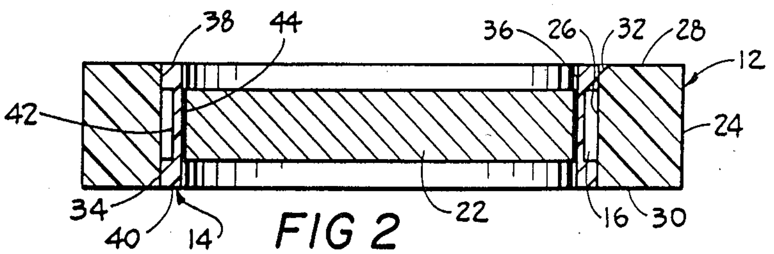
FIG. 2 is a cross section on line 2—2 of FIG. 1.

In FIGS. 1 and 2 of the drawings, an embodiment of a drop dispensing device in accordance with the present invention is generally designated by the reference numeral 10. In the context of overall configuration, organization of component parts and general mode of operation, the device 10 is substantially the same as the drop dispensing device disclosed and claimed in U.S. Pat. No. 4,550,325. As such, the device 10 includes a pair of concentric circular ring members 12 and 14 which provide a sealed annular chamber 16 to which a supply of fluid, such as ink, is connected by an inlet conduit 18. A nozzle 20 opens to the annular chamber 16 and is spaced circumferentially from the conduit 18. In the illustrated embodiment, the inlet conduit 18 and the nozzle 20 are located to be diametrically opposite from each other on the outer ring 12 but other angular relationships of the conduit and nozzle may be used. A circular piezoelectric actuator disk 22 is supported concentrically from the inner disk 14 in a manner to be described in more detail below.

In its preferred form, the drop dispenser 10 has an outer diameter of approximately 0.4 inches and an axial length or height approximating 0.1 inches. These dimensions, as well as other specific dimensions given in the following text, are intended as exemplary and informative, not restrictive in the sense that specific dimensions are required to practice the invention. For example, the device 10 in practice, is considerably smaller in size than that suggested by the illustration in FIG. 1 of the drawings. This is especially true for applications of the device 10 to ink jet printers, where reduction in size is an important objective.

In the embodiment of FIGS. 1 and 2, both the outer and inner rings 12 and 14, respectively, are formed of plastic materials selected to provide flexibility in the inner ring 14 and rigidity in the outer ring 12. While specific plastic material candidates will vary depending on the characteristics of the fluid to be dispensed in drop form by the device 10, the outer ring 12 is formed preferably by injection molding a high flexural modulus material such as carbon filled nylon. The plastic inner ring 14, on the other hand, may be formed either entirely by injection molding of Delrin or in part by injection molding and in part by machining the same material.

The outer ring 12 is essentially rectangular in annular cross-section to establish an outer cylindrical surface 24, a concentric and single inner cylindrical surface 26 and a pair of end faces 28 and 30. A chamfer 32 is provided between the end face 28 and the inner cylindrical surface 26. Where the outside diameter of the outer ring 12 or the diameter of the outer cylindrical surface 24 is 0.400 inches, the inside diameter of the inner cylindrical surface 26 is 0.285 inches to provide a radial thickness of 0.0575 inches. The height of the outer ring is the same as the overall height of the drop dispensing device 10 and may vary from 0.100 inches to 0.150 inches.

The inner ring 14 has a discontinuous outer cylindrical surface 34, an inner cylindrical surface 36 and a pair of end faces 38 and 40 spaced by an axial distance to provide a length in the inner ring 14 the same as the length of the outer ring 12. The surface 34 is interrupted centrally by a peripheral groove 42 in the inner ring 14. The annular chamber 16, therefore, is defined completely by the peripheral groove 42 in the inner ring 14. The groove 42 and the inner surface 36 of the inner ring 14 define a relatively thin flexible wall 44 of an axial length equal to the width of the peripheral groove 42. The axial length of the flexible wall 44 is, moreover, substantially the same as the thickness or axial length of the piezoelectric actuator disk 22.

The plastic inner ring 14 of the device 10 in the embodiments of FIGS. 1 and 2 is dimensioned so that the diameter of the discontinuous outer cylindrical surface sections 34 are between 0.2865 inches and 0.287 inches. Thus the outside diameter of the inner ring 14 exceeds the inside diameter of the outer ring by a dimensional increase of between 0.001 and 0.002 inches. As will be explained in more detail below in connection with the method of the present invention, this diameter differential between the effective outside periphery of the inner ring and the inside diameter of the outer ring enables the two rings to be assembled by press fit alone while insuring a fluid tight closure about the annular chamber 16.

The inside diameter of the inner ring 14 at the surface 36 approximates 0.272 inches to provide a radial thickness approximating 0.015 inches in the inner ring portions lying axially outside the groove 42. The depth of the groove 42 is selected primarily to leave a radial thickness of between 0.003 and 0.005 inches in the flexible wall 44.

Figure 3:
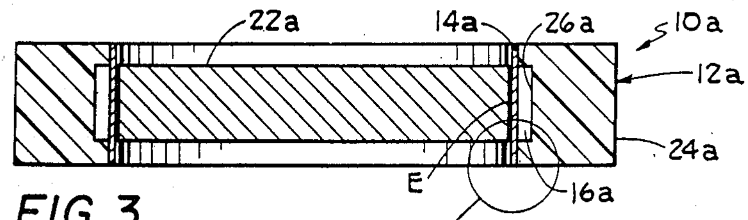
FIG. 3 is a cross section similar to FIG. 2 but illustrating an alternative embodiment of the drop dispensing device.
Figure 3A:
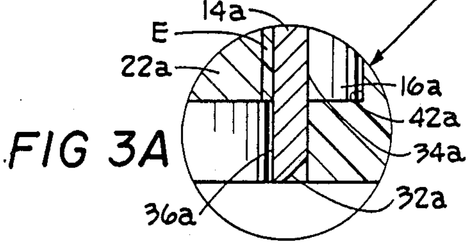
FIG. 3*a* is an enlarged fragmentary cross section of the section within the sight circle A in FIG. 3.

In FIGS. 3 and 3*a* of the drawings, an alternative embodiment of the invention is illustrated in which parts corresponding to those previously identified are designated by the same reference numeral with "a" suffix. Thus, in the drop dispensing device 10*a* of FIG. 3, the annular chamber 16*a* is defined entirely by an inner peripheral groove 42*a* in the outer ring 12*a*. The inner ring 14*a*, in this instance, is formed as a thin metallic ring having continuous inner and outer cylindrical surfaces 34*a* and 36*a* to establish, respectively, the outside and inside diameters of the ring 14*a*. To facilitate press fit assembly of the inner ring 14*a* into the outer ring 12*a* in a manner to be described, a chamfer 32*a* is provided between the bottom edge 40*a* and the outer cylindrical surface 34*a*.

In the illustrated embodiment, the outer ring 12*a* of the device 10*a* is dimensioned so that the radial thickness between the base of the groove 42*a* and the outer cylindrical surface 24*a* is essentially the same as the corresponding dimension in the embodiment previously described with reference to FIGS. 1 and 2. The inner diameter at the cylindrical surface 22*a*, which is discontinuous, is smaller than in the previous embodiment by the depth of the groove 42*a*.

The radial thickness of the inner ring 14*a* in the embodiment of FIG. 3 is approximately 0.003 inches to assure flexure in response to excitation of the piezoelectric actuator 22*a*. Such metals as nickel or stainless steel may be used to form the inner ring 14*a*. While stainless steel is preferred from the standpoint of lower cost, nickel is equally resistant to corrosion by fluids to be dispensed and in addition, is more resistant to metal fatigue.

In FIG. 4, a still further embodiment of the invention is illustrated in which the letter suffix "c" is used with reference numerals to identify parts corresponding to those previously identified in the embodiments of FIGS. 1–3. The embodiment of FIG. 4 is like the embodiment of FIGS. 1 and 2 in the sense that the outer ring 12*c* is essentially the same as the outer ring 12 employed in the embodiment of FIG. 2. The inner ring 14*c* of the device 10*c* however, like the embodiment of FIG. 3, is formed of nickel or stainless steel and is machined to define the outer peripheral groove 42*c* for establishing the chamber 16*c*. like the embodiment of FIG. 2. In this context, it is noted that the formation of the peripheral groove on the exterior of the inner ring 14*c* is preferred from the standpoint of reducing manufacturing costs on a production basis. This premise holds true whether the peripheral groove 42 is formed in a metallic ring such as the ring 14*c* or in a plastic ring such as the ring 14 in the embodiment of FIG. 2.

In FIGS. 5–7 of the drawings, method and apparatus for assembling the drop dispensing devices is depicted. While the drawing illustration of FIGS. 5–7 is specifically applicable to the drop dispensing device 10*c* of FIG. 4, it will become apparent and is intended that the method is applicable to all of the drop device embodiments described above. As illustrated, the apparatus includes a stepped mandrel 50 having a working end portion 52 of a diameter smaller than the diameter of the body of the mandrel 50 to establish a peripheral abutment shoulder 54. As shown in FIG. 7, an anvil 56 having a planar top surface 58 is provided to support the outer ring 12*c*. The anvil further includes a plurality of upwardly projecting actuator supporting pins 60 to facilitate assembly of the piezoelectric actuator 22*c* with the rings 12*c* and 14*c* in a manner to be described.

In FIG. 5, the mandrel 52 is shown with an inner ring blank B mounted thereon. In this connection, the mandrel 50 may be a preformed mandrel to which the ring blank B is fitted by interference fit or by a releasable adhesive. Alternatively, particularly where the inner ring is a very thin cylindrical sleeve such as the ring 14*a* in the embodiment of FIG. 3, the mandrel 50 may be formed of etchable material such as aluminum on which the ring blank B is formed directly on the mandrel by electrodeposition or similar processes.

Upon being supported on the working end 52 of the mandrel 50, the blank B is machined by honing or other such abrading processes to form the peripheral groove 42*c* by rotation of the mandrel 50 and application of a honing tool (not shown). Also during this machining process, particularly in the case of the ring 14*c* of the embodiment of FIG. 4, sharp corners such as those at the junction of end 40*c* and the outer cylindrical surface 34*c* (FIG. 7) of the ring 14*c* as well as the corner between the groove 42*c* and the upper portion of the outer cylindrical surface 34*c* would be rounded or at least softened to eliminate cutting edges.

Once the ring 14*c* is machined on the mandrel 50, the outer ring 12*c* is positioned on the anvil 56 as shown in FIG. 7 and the assembly of the mandrel and the formed inner ring 14*c* forced downwardly into the outer ring 12*c* to the position represented by phantom lines in FIG. 7. The chamfer 32*c* on the outer ring 32 will facilitate the press fit of the inner ring 14*c* within the outer ring 12*c*. Also the softening of sharp edges on the metallic ring 14*c* in this instance will augment the needed expansion of the outer ring and/or compression of the inner ring to accommodate the diameter differential $D_d$ of between 0.001 and 0.002 inches as above described. Once in place, the mandrel 50 is removed from the inner ring either by retaining the outer ring 12*c* while withdrawing the mandrel if the blank B is mounted by interference fit, for example or by etching away the end portion 52 of the mandrel to leave open the central portion of the inner ring 14*c*. In the assembled drop dispensing device, therefore, a fluid-tight seal about the annular chamber 16 is maintained between the inner and outer rings exclusively by inner/outer peripheral surface contact and hoop stress in the rings.

After the inner and outer rings 12*c* and 14*c* have been assembled by press fit, the piezoelectric actuator 22*c* is dropped in place onto the locating pins 60. In this respect, the piezoelectric actuator in all embodiments is of a diameter which is less than the inside diameter of the inner ring 14 so that there will be no interference with insertion of the actuator 22. Once the actuator is located in the inner ring, as illustrated in phantom lines in FIG. 7, the annular space between the outer periphery of the actuator 22*c* and the inner surface 36 of the inner ring 14 is filled with an epoxy E to bond the actuator 22*c* in place. The epoxy E functions as an adhesive to retain the actuator in the assembled drop dispensing device and to transmit peripherally directed force from the actuator to the flexible wall 44 in all embodiments. Additionally, in those embodiments where the inner ring 14 is metallic, such as the inner ring 14*a* of FIG. 3 or the inner ring 14*c* of FIG. 4, the epoxy functions to electrically insulate the piezoelectric actuator from the inner ring. In either case, the epoxy operates as a compressive medium to transmit radial dimension changes in the actuator 22 when excited electrically to reduce the volume of the annular chamber 16.

Thus it will be appreciated that the present invention provides a highly effective drop dispensing device and method for its manufacture by which the above objects, among others, are fulfilled. It will be apparent from the preceding description and is contemplated that modifications and/or changes may be made in the illustrated embodiments without departure from the invention. Accordingly, it is expressly intended that the foregoing description and accompanying drawing illustrations are illustrative only, not limiting, and that the true spirit and scope of the present invention be determined by reference to the appended claims.

I claim:

1. In a drop dispensing device having a planar electroactuator bounded by a peripherally circumferential surface for applying a peripherally directed force in response to electrical excitation, means including concentric inner and outer rings for defining an annular chamber about said circumferential surface, and means defining a fluid inlet and a fluid outlet orifice in communication with said annular chamber for dispensing a drop of fluid upon electrical excitation of said electroactuator, the improvement comprising:

means consisting essentially of peripheral contact between and hoop stress in said rings for retaining said inner and outer rings in fluid tight relationship about said annular chamber.

2. The drop dispensing device recited in claim 1 wherein said annular chamber is defined as a peripheral groove in one of said inner and outer rings.

3. The drop dispensing device recited in claim 2 wherein said inner ring is formed of flexible plastic material.

4. The drop dispensing device recited in claim 2 wherein said inner ring is formed of metal.

5. The drop dispensing device recited in claim 4 wherein said inner ring is formed of stainless steel.

6. The drop dispensing device of claim 4 wherein said inner ring is formed of nickel.

7. The drop dispensing device of claim 2 wherein said groove defines a flexible wall of predetermined axial length in said inner ring.

8. The drop dispensing device recited in claim 7 wherein the thickness of said flexible wall is in the range of between 0.002 and 0.008 inches.

9. The drop dispensing device recited in claim 7 wherein the axial length of said flexible wall is substantially equal to the axial dimension of said electroactuator.

10. The drop dispensing device recited in either of claims 7, 8 or 9 including an annulus of epoxy for securing said electroactuator to the inner surface of said flexible wall.

11. The drop dispensing device recited in claim 2 wherein said outer ring includes a continuous cylindrical surface, said inner ring having said groove in the outer peripheral surface thereof.

12. A method of forming a drop dispensing device having a planar electroactuator bounded by a peripherally circumferential surface for applying a peripherally directed force in response to electrical excitation, means including concentric inner and outer rings for defining an annular chamber about said circumferential surface, and means defining a fluid inlet and a fluid outlet orifice in communication with said annular chamber for dispensing a drop of fluid upon electrical excitation of said electroactuator, said method comprising the steps of:

providing said inner ring with an outside diameter slightly larger than the inside diameter of said outer ring; and pressing said inner ring into said outer ring to seal said annular chamber exclusively by surface contact between and hoop stress in said inner and outer rings.

13. The method recited in claim 12 wherein the outside diameter of said inner ring excludes the inside diameter of said outer ring by an amount in the range of 0.001 to 0.002 inches.

14. The method recited in claim 12 including the step of bonding said electroactuator to said inner ring with a compression transmitting adhesive.

* * * * *